United States Patent
Katz et al.

(10) Patent No.: US 9,693,307 B2
(45) Date of Patent: Jun. 27, 2017

(54) EARLY TERMINATION OF RECEPTION OF WIRELESS TRANSMISSIONS

(71) Applicant: Apple Inc., Cupertino, CA (US)

(72) Inventors: Ran Katz, Givatayim (IL); Koby Levy, Bat-Yam (IL); Koby Vainapel, Herzliya (IL); Lilach Zukerman, Pardesia (IL)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 14/319,900

(22) Filed: Jun. 30, 2014

(65) Prior Publication Data

US 2015/0382303 A1    Dec. 31, 2015

(51) Int. Cl.
*H04W 52/02* (2009.01)

(52) U.S. Cl.
CPC ... *H04W 52/0245* (2013.01); *H04W 52/0216* (2013.01); *H04W 52/0229* (2013.01)

(58) Field of Classification Search
CPC .. H04W 52/02; H04W 52/0203; H04W 84/12
See application file for complete search history.

(56) References Cited

U.S. PATENT DOCUMENTS

| | | | |
|---|---|---|---|
| 7,382,764 B2 | 6/2008 | Uehara | |
| 8,660,144 B2 | 2/2014 | Cordeiro et al. | |
| 8,755,315 B1* | 6/2014 | Kukanur | G08C 17/02 370/252 |
| 8,817,698 B2 | 8/2014 | Gong et al. | |
| 8,830,887 B2 | 9/2014 | Cordeiro | |
| 2006/0146747 A1* | 7/2006 | Shpak | H04W 88/08 370/328 |
| 2007/0177534 A1* | 8/2007 | Chen | H04W 52/0225 370/311 |
| 2007/0201468 A1* | 8/2007 | Jokela | H04L 12/18 370/390 |
| 2008/0181156 A1* | 7/2008 | Ecclesine | H04W 52/0235 370/311 |
| 2008/0232287 A1* | 9/2008 | Shao | H04W 52/0216 370/311 |
| 2009/0086662 A1* | 4/2009 | Okada | H04W 52/0287 370/311 |
| 2009/0158377 A1* | 6/2009 | Diab | G06F 1/266 725/117 |
| 2009/0257370 A1* | 10/2009 | Chen | H04W 52/0225 370/311 |

(Continued)

*Primary Examiner* — Anez Ebrahim
*Assistant Examiner* — Prenell Jones
(74) *Attorney, Agent, or Firm* — Meyertons Hood Kivlin Kowert & Goetzel, P.C.; Jeffrey C. Hood; Joel L. Stevens (57) ABSTRACT

Performing early termination of reception by a mobile station. The mobile station may receive a wireless transmission. The wireless transmission may include a physical layer (PHY) header, a media access control (MAC) header, and data. The mobile station may determine a duration and a destination address from the MAC header. The mobile station may determine if the wireless transmission is intended for the mobile station using the destination address. In response to determining that the wireless transmission is not intended for the mobile station, the mobile station may enter a low power mode prior to completion of the wireless transmission. The length of time of the low power mode may be based on the duration of the first wireless transmission.

20 Claims, 4 Drawing Sheets

(56) References Cited

U.S. PATENT DOCUMENTS

| | | | | |
|---|---|---|---|---|
| 2009/0296619 A1* | 12/2009 | Sammour | H04W 4/08 | 370/311 |
| 2010/0128622 A1* | 5/2010 | Horiuchi | H04B 7/155 | 370/252 |
| 2010/0157865 A1* | 6/2010 | Iyer | H04W 52/0216 | 370/311 |
| 2012/0119902 A1* | 5/2012 | Patro | H04L 12/12 | 340/502 |
| 2012/0127865 A1* | 5/2012 | Nakae | H04B 1/715 | 370/241 |
| 2012/0201276 A1* | 8/2012 | Zhang | H04J 13/102 | 375/135 |
| 2013/0016759 A1* | 1/2013 | Hui | H04B 1/713 | 375/135 |
| 2013/0279381 A1* | 10/2013 | Sampath | H04W 56/00 | 370/311 |
| 2013/0315141 A1* | 11/2013 | Homchaudhuri | H04W 88/06 | 370/328 |
| 2014/0093005 A1* | 4/2014 | Xia | H04B 7/0617 | 375/267 |
| 2014/0112229 A1* | 4/2014 | Merlin | H04W 52/0209 | 370/311 |
| 2014/0126478 A1* | 5/2014 | Cordeiro | H01Q 3/26 | 370/328 |
| 2014/0269544 A1* | 9/2014 | Zhu | H04L 1/1671 | 370/329 |
| 2014/0301295 A1* | 10/2014 | Abraham | H04W 28/044 | 370/329 |
| 2014/0362843 A1* | 12/2014 | Cai | H04W 74/0825 | 370/338 |
| 2015/0071051 A1* | 3/2015 | Zhu | H04W 72/121 | 370/216 |
| 2015/0223163 A1* | 8/2015 | Sammour | H04W 4/08 | 370/311 |

\* cited by examiner

EARLY TERMINATION OF RECEPTION OF WIRELESS TRANSMISSIONS

FIELD

The present disclosure relates to wireless communication, and more particularly to techniques for performing wireless communication with reduced power consumption in systems, such as IEEE 802.11 wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Many devices which implement such wireless communication technologies are substantially mobile devices, which frequently rely on portable power supplies (e.g., batteries). For such devices in particular, as well as for other devices more generally, the power consumption considerations of implementing wireless communication technologies may be substantial. For example, battery life may influence consumer preference among possible wireless devices. Accordingly, improvements in this domain would be desirable.

SUMMARY

Embodiments described herein relate to a method for performing early termination of wireless reception, e.g., of a 802.11 wireless transmission. In particular, a mobile station may begin receiving the wireless transmission. The wireless transmission may include a physical layer (PHY) header, a media access control (MAC) header, and data. The mobile station may determine a duration and a destination address from the MAC header. The mobile station may determine if the wireless transmission is intended for the mobile station using the destination address. In response to determining that the wireless transmission is not intended for the mobile station, the mobile station may enter a low power mode prior to completion of the wireless transmission. The length of time of the low power mode may be based on the duration of the first wireless transmission.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 1:
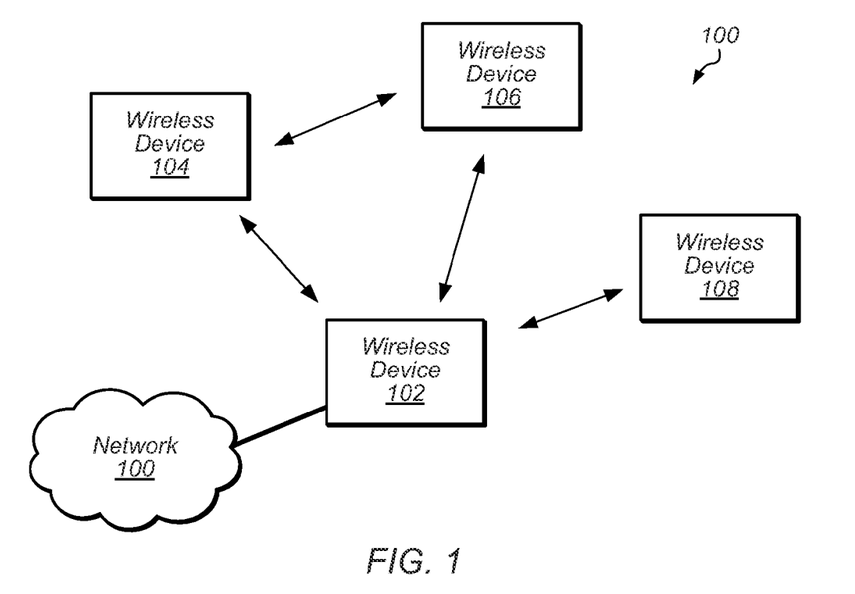
FIGS. 1-2 illustrate exemplary (and simplified) wireless communication systems.
Figure 2:
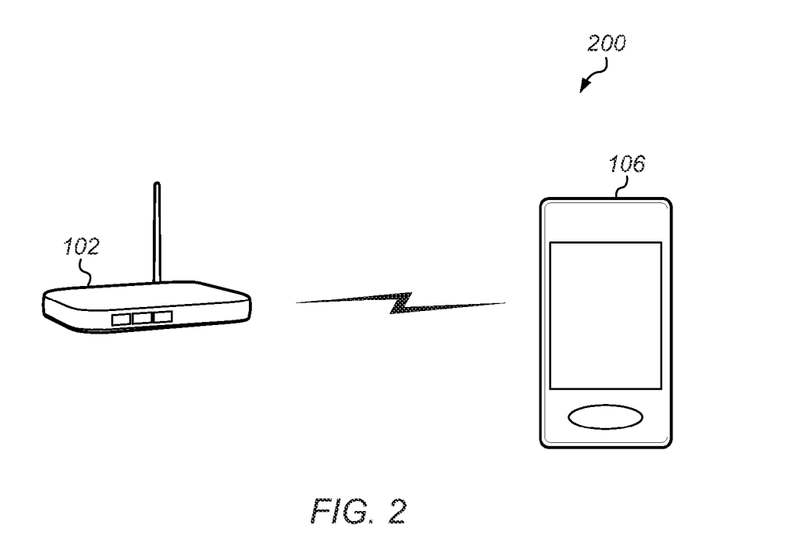

FIGS. 1-2—Communication System

FIG. 1 illustrates an exemplary (and simplified) wireless communication system 100. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to implement various embodiments described herein, e.g., to reduce power consumption.

One or more of the wireless devices may be equipped to communicate with one or more external networks. For example, as shown, wireless device 102 may be communicatively coupled to network 100. The external network(s) may be any of a variety of types of networks, such as a cellular service provider's core network (e.g., via a cellular base station), the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi or WLAN) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates an exemplary wireless communication system 200 in which aspects of the system 100 of FIG. 1 according to one possible implementation are represented. As shown, in the illustrated system wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a hand-held device, a computer or a tablet, or virtually any type of wireless device. The AP 102 may be an access point device with Wi-Fi communication capability such as a wireless router or other wireless access point, although other embodiments are also envisioned.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
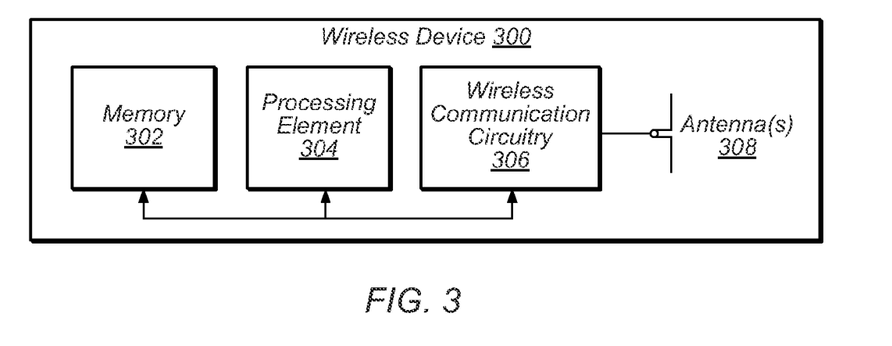
FIG. 3 illustrates a block diagram of an exemplary wireless device.

FIG. 3—Exemplary Block Diagram of a Wireless Device

FIG. 3 illustrates an exemplary block diagram of a wireless device 300 which may be configured for use in conjunction with various aspects of the present disclosure. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc., if desired.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing various embodiments described herein.

Figure 4A:
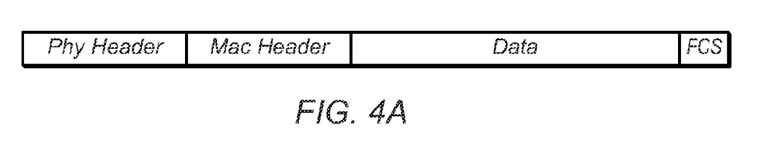
FIGS. 4A-4C illustrate exemplary transmissions.
Figure 4B:
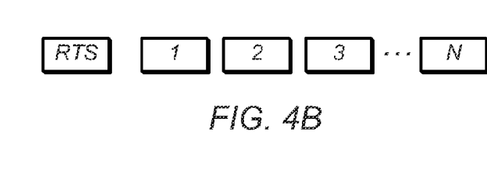
Figure 4C:
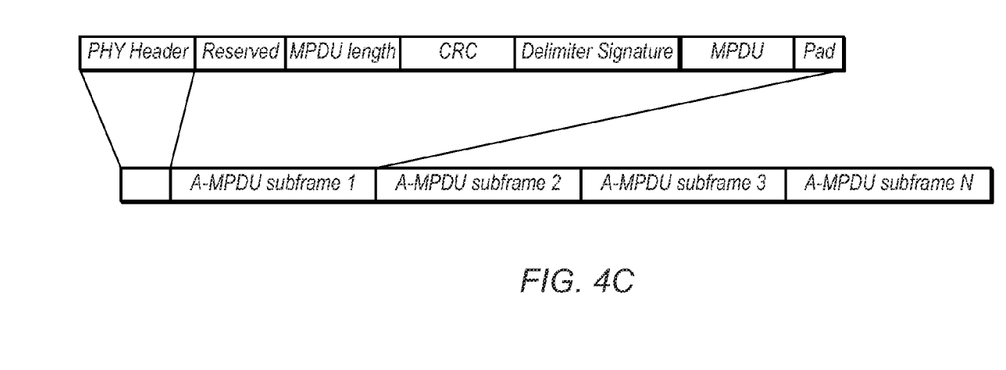

FIGS. 4A-4C—Exemplary Transmissions

FIGS. 4A-4C illustrate exemplary transmission formats for a wireless communication system, such as an IEEE 802.11 wireless communication system.

More specifically, FIG. 4A illustrates an exemplary unaggregated packet transmission. As shown, the transmission includes an initial PHY header, a MAC header, followed by the data of the transmission, and ending with FCS (frame check sequence) field. The PHY header may include information such as packet length and rate. The MAC header may include information such as destination address and duration. The duration field may be used to determine the length of the transmission, e.g., which may be useful for calculating the network allocation vector (NAV), as discussed in more detail below. The FCS field may include CRC (cyclic redundancy check) information that may be used to verify accurate reception of the transmission (e.g., the duration and destination address).

FIG. 4B illustrates an exemplary burst transmission. In this transmission, an initial RTS (request to send) may be transmitted from the transmitter to the receiver. The MAC header in the RTS may indicate the length of the burst via the duration field. After the RTS is transmitted, the receiver may respond with a CTS (clear to send), after which the transmitter may send its burst of packets, shown as "1", "2", "3", "N" in FIG. 4. After this burst of packets, the receiver may respond with a block acknowledgement.

FIG. 4C illustrates an exemplary aggregated transmission, in this case an aggregated MPDU (MAC protocol data unit), which may be referred to as "AMPDU". As shown, in AMPDU, multiple Ethernet frames for a common destination are aggregated and sent as a burst. As shown in this aggregation, each AMPDU subframe includes MPDU length information as well as CRC (cyclic redundancy check) information (which may be used to ensure proper reception of the MPDU), among other information.

Early Termination of Reception of Wireless Packets

In wireless environments, e.g., involving 802.11 systems, there may be multiple devices (e.g., stations and/or access points) transmitting in the same area, which may be referred to as a "congested area" or "noisy environment". In such environments, stations may actively receive non-relevant packets (e.g., ones that are not addressed to the station) while waiting for relevant packets, which may result in undesirable power consumption. As noted previously, reduction in power consumption may be particularly desirable for mobile stations that use a battery. Accordingly, various embodiments herein may allow stations to terminate reception of wireless transmissions upon determining that the transmissions are not relevant to the station, which may allow for a reduction in power consumption for the station. In particular, various embodiments may allow the station (or portions of the station) to enter a sleep state and reduce power consumption significantly when the non-relevant packet(s) are being transmitted. This early termination of reception may be particularly useful for long duration transmissions (e.g., burst or aggregated transmissions discussed above).

Early termination may use one or more of the following parameters: packet length and rate (e.g., to estimate duration in the PHY header), packet address (in the beginning of MAC header), NAV (e.g., in case of burst), RSSI (e.g., to enable receiving stronger packet that will received later), device wakeup time from early termination sleep, SNR (e.g., for matching to current MCS), etc.

Early termination may use one or more of the following embodiments:

In one embodiment, the station may initially determine if the received transmission SNR (signal to noise ratio) matches the current MCS (modulation and coding scheme). If it does not match, then it is likely that the transmission being received is not relevant to the station (e.g., it is a transmission that is for a different station or AP or is from a different AP than the one the station is attached to).

Alternatively, or additionally, the station may compare the RSSI (received signal strength indicator) of the transmission to an expected or threshold RSSI value. For example, the station may have recorded a previous RSSI for a transmission to it from the transmitter (e.g., the AP). If the RSSI of the current transmission is below the expected value, then it is likely that the transmission being received is not relevant to the station (e.g., it is a transmission that is for a different station or AP or is from a different AP than the one the station is attached to).

In one embodiment, the station may determine if the MAC header address matches the address of the station. If it does not, then the station may determine that the transmission is not relevant to it. However, method that is used for comparing the MAC header address may vary depending on transmission type. In particular, since the destination address is information obtained from the transmission being received by the station, then the station cannot be sure that the address (or other information) has been successfully decoded until the transmission or packet is verified using the CRC in the transmission, which may be found in the FCS (frame check sequence) field (e.g., for 802.11 transmissions). Because the different transmissions discussed in FIGS. 4A-4C vary in the location and frequency of the CRC information, the determination of the destination address may vary.

In one embodiment, for non-aggregated packets having a short NAV, it may be assumed that the duration field is small (SIFS+ACK) and there is no need to wait for CRC validation. Accordingly, under this assumption, early termination may be enabled if the initial decoding of the MAC destination address does not match the address of the station. Said another way, for a short duration non-aggregated packet, early termination may occur once the MAC destination address has been initially decoded, without CRC validation, since CRC validation would require full reception of the packet in order to verify that the destination address was correctly decoded (and would therefore provide no power savings). The station may perform early termination within the MAC header of the non-aggregated packet (e.g., see FIG. 4A) and may enter a low power state for the remaining portion of the packet and/or related transmissions (e.g., acknowledgement).

In one embodiment, for burst transmissions having a long NAV (e.g., as indicated by the duration field), the station may continue to receive the transmission up to the first CRC indication. Upon verifying that the MAC destination address of the initial packet in the burst is not the address of the station, the station may terminate reception of the entire burst (e.g., for the length of the NAV). Typically, the first packet in a burst transmission is the CTS/RTS (e.g., as shown in FIG. 4B) and accordingly, the receive time for this first packet may be short (and therefore the CRC verification may not be very costly, power-wise). The station may perform early termination upon receiving and verifying the first packet (e.g., see FIG. 4B), and may enter a low power state for the remaining packets and/or related transmissions (e.g., block acknowledgements) of the burst transmission. For example, referring to FIG. 4B, the low power state may be entered after the RTS packet and may continue until after the Nth packet (e.g., including any responses from the receiver of the burst transmission.

In one embodiment, for AMPDU aggregated transmissions (e.g., which may similarly have a long NAV, as indicated by the duration field), the station may continue to receive the transmission up to the first CRC of the first MPDU. Upon verification that the MAC destination address of the first MPDU is not the address of the station, the station may terminate reception of the entire AMPDU transmission (e.g., for the length of the NAV). The station may perform early termination upon receiving and verifying the first MPDU (e.g., see FIG. 4C) and may enter a low power state for the remaining MPDUs and/or related transmissions (e.g., acknowledgements) of the AMPDU transmission.

In one embodiment, a threshold may be used to determine whether to perform early termination. For example, a receive packet time interval (which may be similar to NAV or used to calculate the NAV) of the transmission may be compared to a threshold. For example, the receive packet time interval may be calculated from 1. Packet length on the PHY header, 2. Rate, and 3. Duration (which includes the other transactions related to this TXOP such as BA, ACK, burst, AMPDU)

However, similar to discussions above, the duration field is not verified until the FCS/CRC information is received. In one embodiment, the duration field may be verified or not, similar to discussions above regarding the destination address (e.g., it may be verified for burst and AMPDU, but not for AMSDU and/or non-aggregated packets).

In one embodiment, for AMPDU/CTS/RTS, the station may receive the first MPDU (including the FCS associated with that MPDU), and the receive may be terminated if: 1. Address is not matching, 2. Packet interval is above threshold X, 3. FCS is ok, 4. RSSI is above threshold. Note that one or more of the conditions may not be necessary, in some embodiments. In MPDU case, which is not AMPDU/CTS/RTS and has long time interval (e.g., AMSDU) (e.g., which is above a threshold), termination may be invoked before receiving the FCS field.

As indicated above, upon invoking early termination, the station may enter a lower power mode, e.g., a sleep state. In one embodiment, there may be two different modes, e.g., which may be entered according to different conditions. In a first mode, which may have a high level of power savings, the radio (e.g., the radio frequency (RF)) circuitry associated with the received transmission (e.g., the 802.11 radio) may be powered off until the transmission completes (e.g., for the duration of the NAV). In one embodiment, the analog circuitry, the digital circuitry, and/or the baseband processor may be powered off in this mode.

However, in a second mode, a more moderate power savings mode may be entered. In this second mode, the radio circuitry (e.g., the 802.11 radio circuitry) may enter a lower power state, but may still be able to detect if a new packet is received within the current transmission (e.g., where a first device transmits over a currently transmitting device).

In one embodiment, the station may choose between the two modes based on the RSSI of the current transmission being received. In particular, similar to RSSI embodiments discussed above, if the RSSI of the current transmission is lower than a threshold (or more generally lower than an expected RSSI for a transmission to the station), then the second mode may be used instead of the first. For example, the current transmission may be from another station or AP that is weaker than expected, and it may still be possible that the expected transmission (e.g., from the station's AP) may be transmitted during the current transmission. Accordingly, the station may not enter the first mode, and may instead enter the second mode, in case the desired transmission is transmitted over the current transmission. If it is, then the station may still be able to successfully receive the desired transmission.

However, if the current transmission RSSI is above the threshold (or matches the expected value), then the station may enter the first mode, and therefore be unable to receive a transmission transmitted over the top of the current transmission. In this case, it is likely that the current transmission is from the desired transmitter (e.g., the station's AP) but is not for the station or the current transmission is strong enough that even if the desired transmission were transmitted over the current transmission, it could not be successfully received due to interference.

Thus, in one embodiment, the power savings mode used upon early termination may depend on current conditions (e.g., the RSSI of the current transmission, among other possibilities).

Figure 5:
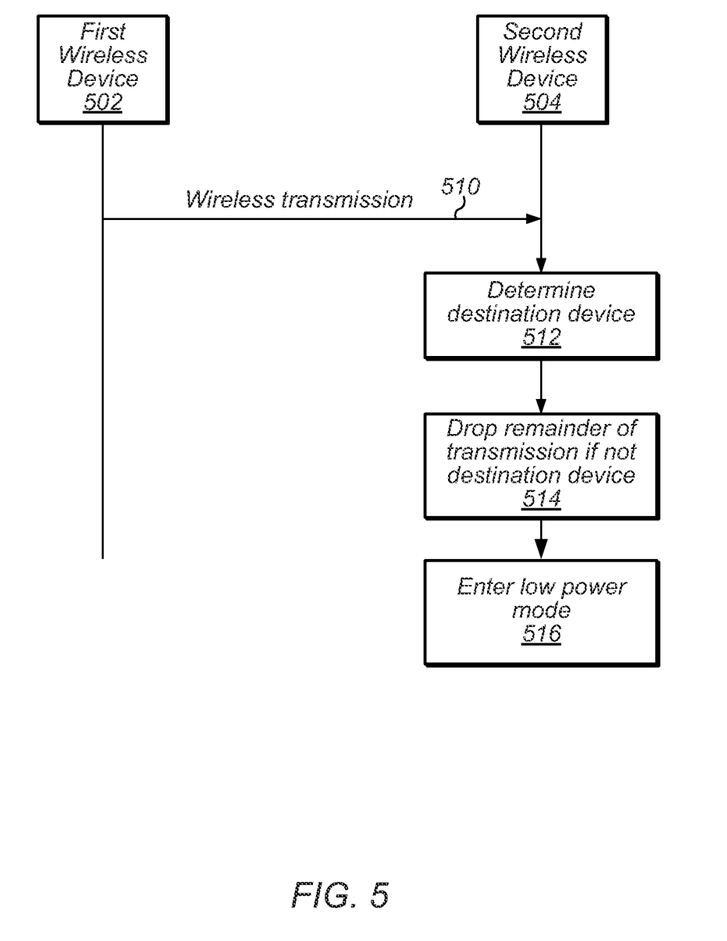
FIG. 5 is a signal flow diagram illustrating aspects of an exemplary method for wireless communication.

FIG. 5—Communication Flow Diagrams

FIG. 5 is a communication/signal flow diagram illustrating a scheme that may be used for performing wireless communication in a wireless communication system, such as an IEEE 802.11 wireless communication system. The scheme may be used to reduce power consumption of devices in the wireless communication system. For example, in the case in which a device determines that it is not the intended destination for a transmission, the device may be able to drop the remainder of the transmission and enter a lower power state (e.g., sleep) for the remaining length of the transmission, thereby avoiding as much unneeded power consumption as possible.

The method shown in FIG. 4 may be used in conjunction with any of the computer systems or devices shown in the above Figures, among other systems or devices. Some of the method elements shown may be performed concurrently, in a different order than shown, or may be omitted. Additional method elements may also be performed as desired. As shown, the methods may operate as follows.

In 510, a first wireless device 502 may perform a wireless transmission (a "first wireless transmission"). The first wireless transmission may be performed according to any of a variety of wireless communication technologies and/or standards, as desired. As one specific possibility, the first wireless transmission may be an IEEE 802.11 (Wi-Fi) transmission. The first wireless transmission may include a physical layer (PHY) header, a media access control (MAC) header, and payload data, among other possible portions.

In 512, the second wireless device 504 may determine if the first wireless transmission is intended for the second wireless device 504. This determination may involve one or a plurality of factors, e.g., including signal strength (e.g., a received signal strength indicator (RSSI) value) of the first wireless transmission, SNR of the first wireless transmission, packet length and rate (e.g., indicated in the PHY header), the destination address (e.g., indicated in the MAC header), the duration (e.g., indicated in the MAC header), and/or other information, as desired.

For example, the second wireless device 504 may determine if the SNR of the first wireless transmission corresponds to the MCS currently used by the second wireless device 504. If it does not, then the second wireless device 502 may infer that the first wireless transmission is not intended for the second wireless device 502.

In a similar fashion, the second wireless device 504 may determine if the signal strength of the first wireless transmission is within an expected range (e.g., if it matches at least a minimum signal strength or expected signal strength from prior transmissions to the second wireless device 504). If it does not, then the second wireless device 502 may infer that the first wireless transmission is not intended for the second wireless device 502.

The second wireless device 504 may also determine a destination address of the first wireless transmission, which may be found in the MAC header. The second wireless device 504 may also determine a duration (e.g., found in the MAC header) and/or determine a NAV for the first wireless transmission. However, since both the duration and the destination address may be determined from information within the first wireless transmission, it may generally be desirable to verify proper decoding using CRC information of the first wireless transmission, if possible. Depending on the type of transmission, CRC verification may or may not be performed by the second wireless device 502.

In particular, where the first wireless transmission is a non-aggregated packet, a CRC verification may not be performed, since the CRC information is generally provided at the end of the packet, which would negate any benefit of early termination (since it could not be terminated until the entire packet was received). Alternatively, early termination may not be performed for non-aggregated packets.

Where the first wireless transmission is a burst transmission, a CRC verification may be performed for the first packet or MPDU of the transmission. Upon verification of the destination address and/or duration using the CRC information, early termination may be performed. The duration may be used to determine how long the first wireless transmission will take, e.g., to determine the duration of a sleep or low power mode, as discussed below. Note that while it may be generally desirable for the CRC verification to apply to the first packet, it may generally be applied as soon as CRC verification is successful (which may be the first packet or a later packet, depending on reception). Early termination can then be performed upon this successful verification.

Similarly, where the first wireless transmission is an AMPDU transmission, where a plurality of MPDUs are aggregated, a CRC verification may be performed for the first MPDU of the AMPDU transmission (or first successful CRC verification). Upon verification of the destination address and/or duration using the CRC information, early termination may be performed. The duration may be used to determine how long the first wireless transmission will take, e.g., to determine the duration of a sleep or low power mode, as discussed below.

Thus, using one or more of the embodiments discussed above, the second wireless device 504 may determine if it is the destination of the first wireless transmission.

Upon determining that it is not the destination device of the first wireless transmission (e.g., with or without CRC verification, as desired), the second wireless device 504 may drop the remainder of the transmission (or perform early termination) in 514.

In 516, the second wireless device 504 may enter a low power mode or sleep mode in response to the early termination in 514. In one embodiment, the second wireless device 504 may enter the low power mode for the determine length of the first wireless transmission (e.g., using the duration or NAV). Thus, for aggregated or burst transmissions, the second wireless device 504 may avoid using power to receive the remainder of the aggregated or burst transmission, upon determining that the transmission is not intended for the second wireless device 504.

In one embodiment, the second wireless device 504 may be configured to enter one of a plurality of low power modes, e.g., based on various conditions. For example, the choice of low power modes may be based on the signal strength (e.g., the RSSI) of the first wireless transmission. For example, if the signal strength is above a threshold (e.g., the same or different signal strength threshold discussed above), then the second wireless device 504 may enter a low power mode that turns off (or substantially turns off) the RF circuitry and/or radio associated with the first wireless transmission (e.g., the WiFi radio of the second wireless device 504). In this mode, the second wireless device 504 may not be able to receive any subsequent transmissions that are transmitted over the first wireless transmission (i.e., during the first wireless transmission).

However, if the signal strength is below the threshold, the second wireless device 504 may be configured to enter a different low power mode, in which the second wireless device 504 may still monitor the wireless transmission medium for additional transmissions. For example, the first wireless transmission may be from a device other than the one the second wireless device 504 is in communication with, and the other device may still transmit during the first wireless transmission. Since the first wireless transmission is below the threshold, it may be possible for the second wireless device 504 to receive the second transmission from the other device even while the first wireless transmission is still occurring. Should this other transmission occur and be targeted to the second wireless device 504, the second wireless device 504 may exit the low power mode and receive the new transmission.

Thus, the selection of the low power mode may be based on characteristics of the first wireless transmission, as desired. Characteristics other than signal strength are also envisioned.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing reception by a mobile station, comprising:
at the mobile station:
receiving a first wireless transmission, wherein the first wireless transmission comprises a plurality of subframes, wherein at least a first subframe of the plurality of subframes comprises a physical layer (PHY) header, a media access control (MAC) header, and data;
determining a duration and a destination address of the first wireless transmission from the MAC header of the first subframe of the first wireless transmission;
receiving cyclic redundancy check (CRC) information of the first subframe of the first wireless transmission;
verifying the duration and destination address using the CRC information;
determining if the first wireless transmission is intended for the mobile station using the destination address; and
in response to determining that the first wireless transmission is not intended for the mobile station, entering a low power mode, wherein entering the low power mode is performed prior to completion of the first wireless transmission, wherein the length of time of the low power mode is based on the duration of the first wireless transmission, and wherein the length of time of the low power mode comprises at least the remaining subframes of the first wireless transmission.

2. The method of claim 1, further comprising:
determining a received signal strength indicator (RSSI) of the first wireless transmission;
wherein entering the low power mode is based on the RSSI of the first wireless transmission.

3. The method of claim 2, further comprising:
comparing the RSSI of the first wireless transmission to a threshold;
wherein entering the low power mode comprises turning off radio frequency (RF) circuitry associated with the first wireless transmission based on the RSSI of the first wireless transmission exceeding the threshold.

4. The method of claim 2, further comprising:
comparing the RSSI of the first wireless transmission to a threshold;
based on the RSSI of the first wireless transmission being below the threshold, monitoring for a second wireless transmission transmitted during the first wireless transmission.

5. The method of claim 1, wherein the first wireless transmission comprises an aggregation of a plurality of MPDUs (MAC protocol data units), wherein the method further comprises:
receiving cyclic redundancy check (CRC) information of a first MPDU of the first wireless transmission; and
verifying the duration and destination address using the CRC information;
wherein said determining if the first wireless transmission is intended for the mobile station is performed based on said verifying, and wherein the length of time of the low power mode comprises at least the remaining MPDUs of the first wireless transmission.

6. The method of claim 1, further comprising:
determining a signal strength of the first wireless transmission;
wherein said determining if the first wireless transmission is intended for the mobile station is further based on the signal strength of the first wireless transmission.

7. The method of claim 1, further comprising:
determining a signal to noise ratio (SNR) of the first wireless transmission;
determining if the SNR of the first wireless transmission corresponds to a modulation and coding scheme (MCS) used by the mobile station;
wherein said determining if the first wireless transmission is intended for the mobile station is based on determining if the SNR of the first wireless transmission corresponds to the MCS used by the mobile station.

8. The method of claim 1, wherein the first wireless transmission comprises an 802.11 transmission.

9. A mobile station, comprising:
one or more radios, coupled to one or more antennas configured for wireless communication; and
a processing element operably coupled to the one or more radios;
wherein the processing element is configured to operate with the one or more radios to:
receive a first wireless transmission, wherein the first wireless transmission comprises an aggregation of a plurality of MPDUs (MAC protocol data units), wherein a first MPDU of the first wireless transmission comprises a media access control (MAC) header;
determine at least a duration and a destination address of the first wireless transmission from the MAC header;
receive cyclic redundancy check (CRC) information of the first MPDU of the first wireless transmission;
verify the duration and destination address using the CRC information;
determine if the first wireless transmission is intended for the mobile station at least based on the destination address; and
in response to determining that the first wireless transmission is not intended for the mobile station, cause a first radio of the one or more radios to enter a low power mode, wherein entering the low power mode is performed prior to completion of the first wireless transmission, wherein the length of time of the low power mode is based on the duration of the first wireless transmission, and wherein the length of time of the low power mode comprises at least the remaining MPDUs of the first wireless transmission.

10. The mobile station of claim 9, wherein the processing element is further configured to:
determine a signal strength of the first wireless transmission;
compare the signal strength to a threshold;
wherein entering the low power mode comprises entering a first low power mode if the signal strength is below the threshold and entering a second low power mode if the signal strength is above the threshold.

11. The mobile station of claim 10, wherein determining the signal strength of the first wireless transmission comprises determining a received signal strength indicator (RSSI) of the first wireless transmission.

12. The mobile station of claim 10, wherein, while in the first low power mode, the first radio is powered off and while in the second low power mode, the mobile station is further configured to monitor for a second wireless transmission transmitted during the first wireless transmission.

13. The mobile station of claim 9, wherein the processing element is further configured to:
  determine a signal strength of the first wireless transmission;
  wherein determining if the first wireless transmission is intended for the mobile station is further based on the signal strength of the first wireless transmission.

14. The mobile station of claim 9, wherein the processing element is further configured to:
  determine a signal to noise ratio (SNR) of the first wireless transmission;
  determine if the SNR of the first wireless transmission corresponds to a modulation and coding scheme (MCS) used by the mobile station;
  wherein determining if the first wireless transmission is intended for the mobile station is based on determining if the SNR of the first wireless transmission corresponds to the MCS used by the mobile station.

15. An apparatus, comprising:
  one or more processing elements, wherein the one or more processing elements are coupled to one or more radios configured for wireless communication, wherein the one or more processing elements are configured to operate with the one or more radios to:
    receive a first wireless transmission, wherein the first wireless transmission comprises an aggregation of a plurality of MPDUs (MAC protocol data units), wherein a first MPDU of the first wireless transmission comprises a media access control (MAC) header;
    determine at least a duration and a destination address of the first wireless transmission from the MAC header;
    receive cyclic redundancy check (CRC) information of the first MPDU of the first wireless transmission;
    verify the duration and destination address using the CRC information;
    determine if the first wireless transmission is intended for the mobile station at least based on the destination address; and
    in response to determining that the first wireless transmission is not intended for the mobile station, cause a first radio of the one or more radios to enter a low power mode, wherein entering the low power mode is performed prior to completion of the first wireless transmission, wherein the length of time of the low power mode is based on the duration of the first wireless transmission, and wherein the length of time of the low power mode comprises at least the remaining MPDUs of the first wireless transmission.

16. The apparatus of claim 15, wherein the one or more processing elements are further configured to:
  determine a signal strength of the first wireless transmission;
  compare the signal strength to a threshold;
  wherein entering the low power mode comprises entering a first low power mode if the signal strength is below the threshold and entering a second low power mode if the signal strength is above the threshold.

17. The apparatus of claim 16, wherein, while in the first low power mode, the first radio is powered off and while in the second low power mode, the mobile station is further configured to monitor for a second wireless transmission transmitted during the first wireless transmission.

18. The apparatus of claim 16, wherein determining the signal strength of the first wireless transmission comprises determining a received signal strength indicator (RSSI) of the first wireless transmission.

19. The apparatus of claim 15, wherein the one or more processing elements are further configured to:
  determine a signal strength of the first wireless transmission;
  wherein determining if the first wireless transmission is intended for the mobile station is further based on the signal strength of the first wireless transmission.

20. The apparatus of claim 15, wherein the one or more processing elements are further configured to:
  determine a signal to noise ratio (SNR) of the first wireless transmission;
  determine if the SNR of the first wireless transmission corresponds to a modulation and coding scheme (MCS) used by the mobile station;
  wherein determining if the first wireless transmission is intended for the mobile station is based on determining if the SNR of the first wireless transmission corresponds to the MCS used by the mobile station.

* * * * *